United States Patent
Huang (10) Patent No.: US 11,221,108 B2
(45) Date of Patent: Jan. 11, 2022

(54) LED LIGHT BULB AND MANUFACTURING METHOD THEREOF

(71) Applicant: Liquidleds Lighting Corporation, Taipei (TW)

(72) Inventor: Chien-Lang Huang, Taipei (TW)

(73) Assignee: Liquidleds Lighting Corporation, Taipei (TW)

(*) Notice: Subject to any disclaimer, the term of this patent is extended or adjusted under 35 U.S.C. 154(b) by 0 days.

(21) Appl. No.: 16/988,730

(22) Filed: Aug. 10, 2020

(65) Prior Publication Data

US 2021/0095821 A1  Apr. 1, 2021

Related U.S. Application Data

(63) Continuation of application No. 16/120,306, filed on Sep. 3, 2018, now abandoned.

(30) Foreign Application Priority Data

Sep. 1, 2017  (TW) .................................. 106130001

(51) Int. Cl.
  *F21V 15/01*  (2006.01)
  *F21K 9/232*  (2016.01)
  (Continued)

(52) U.S. Cl.
  CPC .............. *F21K 9/232* (2016.08); *F21K 9/66* (2016.08); *F21K 9/90* (2013.01); *F21V 3/061* (2018.02);
  (Continued)

(58) Field of Classification Search
  CPC .......... F21K 9/232; F21K 9/66; F21V 23/002; F21V 3/061
  (Continued)

(56) References Cited

U.S. PATENT DOCUMENTS 3,663,793 A ‡ 5/1972 Petro .................. B23K 26/0823
  219/12
9,599,826 B2 ‡ 3/2017 Bonsack ................ G02B 27/08
  (Continued)

FOREIGN PATENT DOCUMENTS

CN  102374392  ‡  3/2012
CN  203656627  ‡  6/2014
  (Continued)

OTHER PUBLICATIONS

"Office Action of China Counterpart Application", dated Dec. 2, 2019, p. 1-p. 13.‡
  (Continued)

*Primary Examiner* — Christopher M Raabe
(74) *Attorney, Agent, or Firm* — JCIPRNET (57) ABSTRACT

A LED light bulb includes a bulb envelope, a stem, at least two conductors, at least one LED light emitting module, and fluid. The bulb envelope has an opening, and a material of the bulb envelope includes soda-lime glass. The stem is connected to the bulb envelope and seals the opening. Here, the stem has a supporting portion and a pipe, the supporting portion is located in the bulb envelope, and the pipe has an open end inside the bulb envelope and a sealed end outside the bulb envelope. The conductors are located through the stem. The LED light emitting module is assembled to the supporting portion and coupled to the conductors. The fluid fills the bulb envelope. The bulb envelope made of soda-lime glass enhances visual effects produced by the shape, color and light reflection of the LED light bulb.

14 Claims, 6 Drawing Sheets

(51) Int. Cl.
*F21K 9/66* (2016.01)
*F21K 9/90* (2016.01)
*F21V 3/06* (2018.01)
*H05B 45/40* (2020.01)
*F21V 23/00* (2015.01)
*F21V 3/02* (2006.01)
*F21Y 107/70* (2016.01)
*F21Y 115/10* (2016.01)

(52) U.S. Cl.
CPC ............ *F21V 23/002* (2013.01); *H05B 45/40* (2020.01); *F21V 3/02* (2013.01); *F21Y 2107/70* (2016.08); *F21Y 2115/10* (2016.08)

(58) Field of Classification Search
USPC .................................................. 362/249.06
See application file for complete search history.

(56) References Cited

U.S. PATENT DOCUMENTS

| | | | | |
|---|---|---|---|---|
| 10,718,471 | B1 * | 7/2020 | Wu | F21K 9/66 |
| 2005/0207152 | A1 ‡ | 9/2005 | Maxik | H05K 1/189 |
| | | | | 362/23 |
| 2008/0013316 | A1 ‡ | 1/2008 | Chiang | F21V 29/51 |
| | | | | 362/26 |
| 2010/0271836 | A1 ‡ | 10/2010 | Bakk | F21K 9/00 |
| | | | | 362/547 |
| 2011/0273863 | A1 ‡ | 11/2011 | Cai | F21V 9/32 |
| | | | | 362/84 |
| 2012/0212137 | A1 ‡ | 8/2012 | Chiang | F21V 3/00 |
| | | | | 315/11 |
| 2013/0058080 | A1 ‡ | 3/2013 | Ge | F21V 19/005 |
| | | | | 362/23 |
| 2015/0036341 | A1 ‡ | 2/2015 | Ge | F21V 13/08 |
| | | | | 362/240 |
| 2018/0328544 | A1 ‡ | 11/2018 | Rieder | F21K 9/68 |
| 2019/0056095 | A1 * | 2/2019 | Li | F21V 1/20 |
| 2019/0277487 | A1 ‡ | 9/2019 | Ren | F21V 29/75 |
| 2020/0271278 | A1 * | 8/2020 | Lei | F21K 9/237 |

FOREIGN PATENT DOCUMENTS

| | | | |
|---|---|---|---|
| CN | 203743911 | ‡ | 7/2014 |
| CN | 204026210 | ‡ | 12/2014 |
| CN | 204083893 | ‡ | 1/2015 |
| CN | 204176377 | ‡ | 2/2015 |
| CN | 104676317 | ‡ | 6/2015 |
| CN | 205560604 | ‡ | 9/2016 |
| CN | 205678458 | ‡ | 11/2016 |
| CN | 106917971 | ‡ | 7/2017 |
| EP | 0092203 | ‡ | 10/1983 |
| EP | 2416056 | ‡ | 2/2012 |
| EP | 3208514 | ‡ | 8/2017 |
| JP | S532979 | ‡ | 1/1978 |
| JP | 2005174891 | ‡ | 6/2005 |
| JP | 3159000 | ‡ | 5/2010 |
| JP | 2012038704 | ‡ | 2/2012 |
| JP | 2013225587 | ‡ | 10/2013 |
| JP | 2015162434 | ‡ | 9/2015 |
| JP | 2017103232 | ‡ | 6/2017 |
| TW | 201723379 | ‡ | 7/2017 |
| WO | WO-2009083853 | ‡ | 7/2009 |
| WO | WO-2017055115 | ‡ | 4/2017 |

OTHER PUBLICATIONS

"Office Action of Japan Counterpart Application," dated Oct. 29, 2019, p. 1-p. 6.‡

"Search Report of Europe Counterpart Application", dated Mar. 6, 2019, p. 1-p. 28.‡

\* cited by examiner
‡ imported from a related application

LED LIGHT BULB AND MANUFACTURING METHOD THEREOF

CROSS-REFERENCE TO RELATED APPLICATION

This is a continuation application of and claims the priority benefit of U.S. patent application Ser. No. 16/120,306, filed on Sep. 3, 2018, which claims the priority benefit of Taiwan application serial no. 106130001, filed on Sep. 1, 2017. The entirety of the above-mentioned patent application is hereby incorporated by reference herein and made a part of this specification.

BACKGROUND

Technical Field

The disclosure relates to a light emitting diode (LED) light bulb, and more particularly relates to an LED light bulb and a manufacturing method thereof.

Description of Related Art

With the improvement of the light emitting efficiency of light emitting diode (LED) dies and the advancement of production technology, the LED dies have gradually become light sources of lighting fixtures. Although light bulbs with use of tungsten filaments have been gradually replaced by LED light emitting modules, the LED light bulbs in the filament shape are still favored by designers. The LED light bulb of filament shape basically refer to bar-shaped or spiral LED light emitting modules disposed in the bulb envelopes. The LED light emitting modules are applied in the bulb envelopes having different looks and being made of various materials, and thereby users can get a completely different visual experience.

SUMMARY

The disclosure provides a light emitting diode (LED) light bulb to be an LED light bulb of filament shape.

The disclosure provides a manufacturing method of an LED light bulb for manufacturing the LED light bulb in the filament shape.

In an embodiment of the disclosure, an LED light bulb including a bulb envelope, a stem, at least two conductors, at least one LED light emitting module, and fluid is provided. The bulb envelope has an opening, and a material of the bulb envelope includes soda-lime glass. The stem is connected to the bulb envelope and seals the opening. Here, the stem has a supporting portion and a pipe, the supporting portion is located in the bulb envelope, and the pipe has an open end inside the bulb envelope and a sealed end outside the bulb envelope. The conductors are located through the stem. The LED light emitting module is assembled to the supporting portion and coupled to the conductors. The fluid fills the bulb envelope.

An LED light bulb of the disclosure including a bulb envelope, a stem, at least two conductors, at least one LED light emitting module, fluid, and a supporting bracket is provided. The bulb envelope has an opening, and a material of the bulb envelope includes soda-lime glass. The stem is connected to the bulb envelope and seals the opening. Here, the stem has a supporting portion and a pipe, the supporting portion is located in the bulb envelope, and the pipe has an open end inside the bulb envelope and a sealed end outside the bulb envelope. The conductors are located through the stem. The LED light emitting module is assembled to the supporting portion and coupled to the conductors. The fluid fills the bulb envelope. The supporting bracket is assembled to the supporting portion and leans against the bulb envelope. The number of contacts between the supporting bracket and the bulb envelope is equal to or greater than 2, and a maximum linear distance among the contacts is greater than a maximum inner diameter of the opening.

In an embodiment of the disclosure, the bulb envelope has a sidewall and a bottom wall connected to the sidewall at an intersection, and at least one of the contacts between the supporting bracket and the bulb envelope is located at the intersection.

In an embodiment of the disclosure, the supporting bracket has a trunk and a plurality of branches, the trunk extends from the supporting portion, the LED light emitting module is assembled to the trunk, and the branches extend from one end of the trunk and respectively contact the bulb envelope.

In an embodiment of the disclosure, an LED light bulb including a bulb envelope, a stem, at least two conductors, at least one LED light emitting module, fluid, and a supporting bracket is provided. The bulb envelope has an opening, and a material of the bulb envelope includes soda-lime glass. The stem is connected to the bulb envelope and seals the opening. Here, the stem has a supporting portion and a pipe, the supporting portion is located in the bulb envelope, and the pipe has an open end inside the bulb envelope and a sealed end outside the bulb envelope. The conductors are located through the stem. The LED light emitting module is assembled to the supporting portion and coupled to the conductors. The fluid fills the bulb envelope. The bulb envelope is shaped as a bottle and extends along a central axis, and a projection length of the LED light emitting module on the central axis is greater than 40% of a projection length of the bulb envelope on the central axis.

In an embodiment of the disclosure, the LED light bulb further includes a bulb head assembled to the bulb envelope and coupled to the conductors.

In an embodiment, the number of the LED light emitting module is equal to or greater than 2, and the LED light emitting modules are connected in series or in parallel.

In an embodiment of the disclosure, the LED light emitting module is a rigid LED light emitting module or a flexible LED light emitting module.

In an embodiment of the disclosure, the fluid is non-conductive fluid.

In an embodiment of the disclosure, the fluid is inert gas.

In an embodiment of the disclosure, the fluid is helium gas.

In an embodiment of the disclosure, the LED light bulb further includes an outer bulb casing and liquid. The outer bulb casing surrounds the bulb envelope, so that the outer bulb casing and the bulb envelope together form a layered space surrounding the bulb envelope. The liquid is located in the layered space.

In an embodiment of the disclosure, the bulb envelope has a standing portion providing a standing function.

a manufacturing method of an LED light bulb of the disclosure includes following steps. A stem and at least one LED light emitting module of a supporting portion assembled to the stem are positioned in a bulb envelope through an opening of the bulb envelope, wherein the LED light emitting module is coupled to and located through at least two conductors of the stem. The opening of the bulb envelope and a portion of a neck portion adjacent to the opening are pre-heated for a pre-heating time period, so that a temperature at which the opening and the neck portion are heated is a pre-heating temperature. After the pre-heating step, the opening of the bulb envelope and the portion of the neck portion adjacent to the opening are heated, so that the temperature at which the opening and the neck portion are heated is a main-heating temperature, and a side skirt of the stem is simultaneously sintered to the bulb envelope to seal the opening of the bulb envelope. After the heating step, residual air is pumped from the bulb envelope through a pipe of the stem. After the pumping step, fluid is introduced into the bulb envelope through the pipe of the stem. After the introducing step, the pipe is sealed, so that the bulb envelope is in an airtight state.

In an embodiment of the disclosure, after sintering the side skirt of the stem to the bulb envelope, the manufacturing method further includes a step of post-heating the opening of the bulb envelope and the neck portion for a post-heating time period, so that the temperature at which the opening and the neck portion are heated is a post-heating temperature.

In an embodiment of the disclosure, the post-heating temperature is lower than or equal to the pre-heating temperature.

In an embodiment of the disclosure, the manufacturing method further includes a step of assembling a bulb head to the bulb envelope, and the bulb head is coupled to the conductors.

In an embodiment of the disclosure, a material of the bulb envelope is soda-lime glass.

In an embodiment of the disclosure, a length of the portion of the neck portion adjacent to the opening is greater than half a maximum inner diameter of the opening.

In view of the above, in the disclosure, the bulb envelope made of soda-lime glass enhances visual effects produced by the shape, color and light reflection of the LED light bulb. Besides, the arrangement of the supporting bracket (especially the supporting bracket may be deployed after passing through the opening of the bulb envelope and may lean against an inner surface of the bulb envelope) allows the LED light emitting module to be stably positioned in the bulb envelope. Besides, when the bulb envelope is shaped as a bottle or has an elongated shape similar to the bottle shape, the length of the LED light emitting module may be greater than 40% of the length of the bulb envelope, so as to enhance the visual effects produced by the LED light bulb.

To make the above features and advantages provided in one or more of the embodiments of the disclosure more comprehensible, several embodiments accompanied with drawings are described in detail as follows.

DESCRIPTION OF THE EMBODIMENTS

Figure 1:
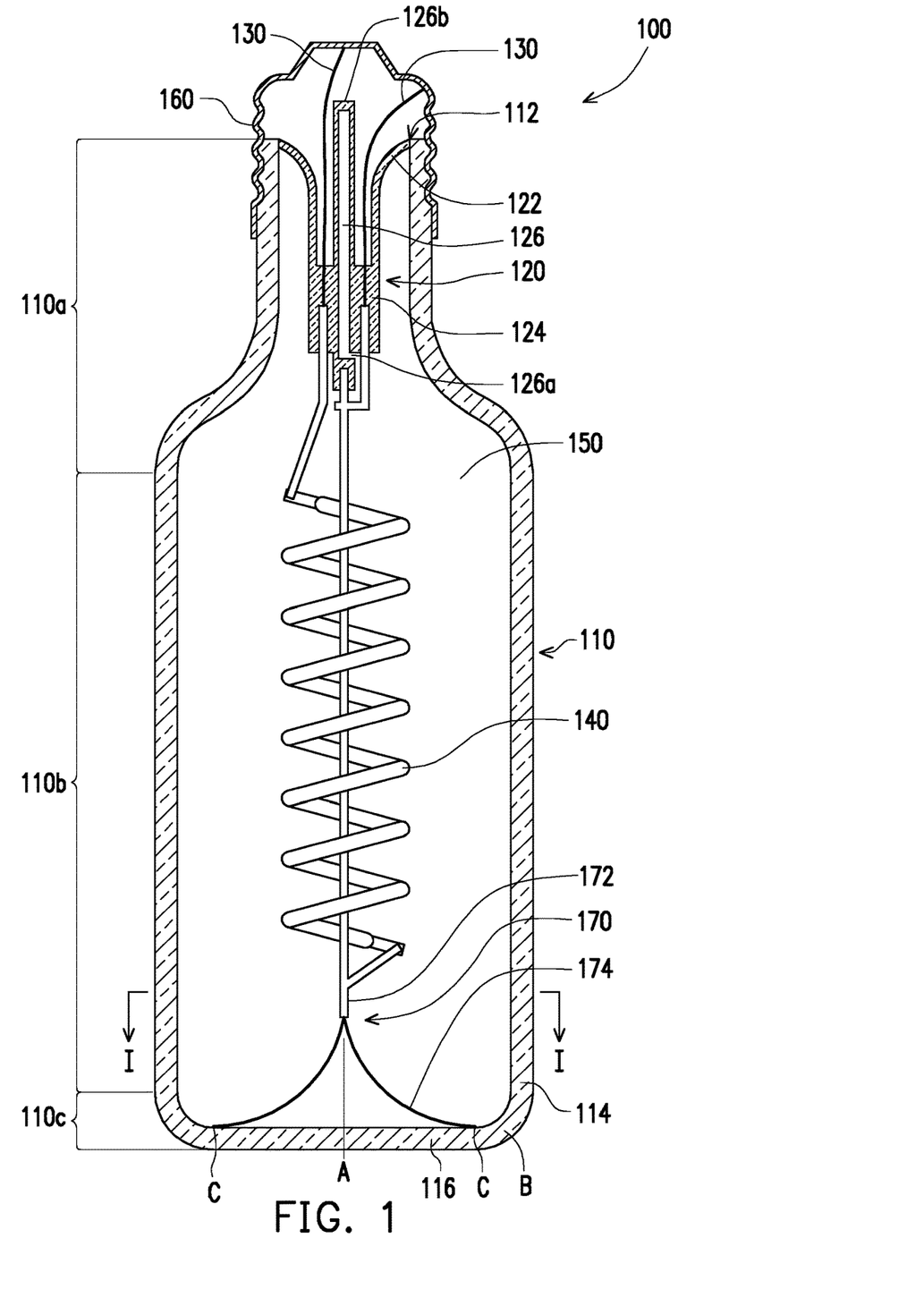
FIG. 1 is a cross-sectional view illustrating a light emitting diode (LED) light bulb according to an embodiment of the disclosure.

With reference to FIG. 1, in the present embodiment, a light emitting diode (LED) light bulb 100 includes a bulb envelope 110, a stem 120, a plurality of conductors 130, an LED light emitting module 140, and fluid 150. The bulb envelope 110 and the stem 120 are presented in cross-section. The bulb envelope 110 has an opening 112. The stem 120 (e.g., a side skirt 122 of the stem 120) is connected to the bulb envelope 110 and seals the opening 112. The stem 120 has a supporting portion 124 and a pipe 126, the supporting portion 124 is located in the bulb envelope 110, and the pipe 126 has an open end 126a inside the bulb envelope 110 and a sealed end 126b outside the bulb envelope 110. The conductors 130 are located through the stem 120. The LED light emitting module 140 is assembled to the supporting portion 124 and coupled to the conductors 130.

In the present embodiment, the conductors 130 may be constructed by conductors that are of different thicknesses and soldered to each other or bent so as to be coupled to the LED light emitting module 140. The fluid 150 fills the bulb envelope 110. The fluid 150 may be non-conductive fluid 150, e.g., inert gas (such as helium gas).

In the present embodiment, the LED light bulb 100 may further include a bulb head 160 assembled to the bulb envelope 110 and coupled to the conductors 130. In FIG. 1, the bulb head 160 is also presented in cross-section. In other embodiments not shown in the drawings, the LED light bulb 100 may not include the bulb head 160, and the conductors 130 are directly connected to the power source.

Since soda-lime glass is not easy to be processed due to its property, the bulb envelope is conventionally not made of soda-lime glass but made of lead silicate glass or borosilicate glass. In the present embodiment, if certain manufacturing steps are performed, the bulb envelope 110 may be made of soda-lime glass with advantages of low manufacturing costs, and after soda-lime glass is infiltrated into certain element or substance, the soda-lime glass may be of different crystal clear colors. However, because of the large coefficient of thermal expansion of the soda-lime glass, if a certain area receives an excessive amount of heat, the area is likely to be fractured due to the excessive expansion. Hence, in a technology requiring thermal process such as manufacturing of light bulbs, the use of soda-lime glass is not considered. The more formal name of soda-lime glass is soda-lime-silica glass, and is also abbreviated as soda glass. The basic ingredients of soda-lime glass is silicon dioxide ($SiO_2$) containing aluminum oxide at a certain ratio and calcium oxide at a certain ratio. In the present embodiment, soda-lime glass is manufactured by melting 65%-75% of $SiO_2$, 12%-18% of $Na_2CO_3$, 5%-12% of $CaCO_3$, and other materials at a high temperature, shaping them and cooling them. The soda-lime-silica glass is the oldest glass system in production history, and is also a kind of glass with highest output and most versatility. Soda-lime glass is often used in glass containers, especially bottles for food packaging.

In the present embodiment, the bulb envelope 110 may be a container made of soda-lime glass, especially recycled wine bottles. In addition to the purpose of environmental protection and energy conservation, the visual effects produced by the shapes, colors and light reflections of the commercially available wine bottles are extremely diverse. Hence, when the bulb envelope 110 is a wine bottle or any other container made of soda-lime glass, the bulb envelope 110 may provide richer and more diverse visual effects than the conventional bulb envelope made of lead silicate glass or borosilicate glass.

Figure 2:
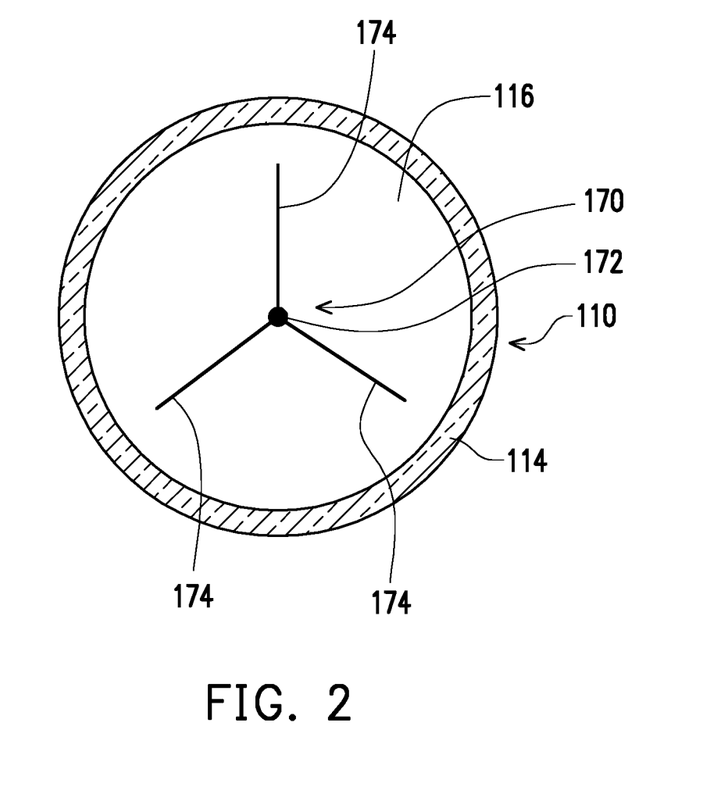
FIG. 2 is a cross-sectional view illustrating the LED light bulb depicted in FIG. 1 along Line I-I.

With reference to FIG. 1 and FIG. 2, in the present embodiment, to position the LED light emitting module 140 in the bulb envelope 110, the LED light bulb 100 may further include a supporting bracket 170 assembled to the supporting portion 124 and leaning against the bulb envelope 110. The number of contacts C between the supporting bracket 170 and the bulb envelope 110 is equal to or greater than 2; namely, the stability of the positioning action may be improved by multi-point contact, thereby the LED light emitting module 140 may be stably positioned in the bulb envelope. When the light bulb 100 is shaken, the LED light emitting module 140 inside the light bulb may be relatively stabilized, so as to prevent the possibility of breakage or being bent. The maximum linear distance between the contacts C is greater than the maximum inner diameter of the opening 112; that is, the supporting bracket 170 may be deployed after passing through the opening 112 of the bulb envelope 110 and may lean against the inner surface of the bulb envelope 110.

In the present embodiment, the bulb envelope 110 has a sidewall 114 and a bottom wall 116 connected with the sidewall 114 at an intersection B. At least one of the contacts C of the supporting bracket 170 and the bulb envelope 110 is located at the intersection B. Here, the sidewall 114 may, as shown in FIG. 1, be a flat curved surface; that is, viewed from the side cross-sectional view, two sides of the sidewall 114 appear to be an approximately straight line extending upward from the intersection B. In another embodiment, the sidewall 114 may be a curved surface; that is, the side cross-sectional view of the sidewall 114, any side of the sidewall appears to be a curved line extend upward from the intersection B. Besides, as depicted in FIG. 1, an angle between the sidewall 114 and the bottom wall 116 at the intersection B is about 90 degrees, and the form thereof is a rounded angle; in another embodiment, an angle between the sidewall 114 and the bottom wall 116 at the intersection B may be an acute angle, an obtuse angle, or in another form. From another point of view, when the bulb envelope 110 is a wine bottle or a similar elongated bottle, the bulb envelope 110 has a neck portion 110a that is tapered in shape to constitute the opening 112, a body portion 110b following the neck portion 110a, and a standing portion 110c that follows the body portion 110b but is away from the neck portion 110a. The contacts C of the supporting bracket 170 and the bulb envelope 110 are located at the standing portion 110c. The standing portion 110c may provide a standing function and is thus not limited to be in the flat shape shown in FIG. 1; namely, the type of the standing portion 110c may be a curved-surface shape, a multi-claw shape, a concentric-circle shape, and so on. In another embodiment, the standing portion may not stand on the ground; namely, in consideration of the type of the lamp stand, the standing portion 110c may stand in the air and may be spaced from the ground or the desktop by a height. Besides, compared to the LED light bulb 100 shown in FIG. 1, the LED light bulb 100 may be turned upside down, i.e., the bulb head 160 faces down and the standing portion 110c faces up.

In the present embodiment, the supporting bracket 170 includes a trunk 172 and a plurality of branches 174. The trunk 172 extends from the supporting portion 124, the LED light emitting module 140 is assembled to the trunk 172, and the branches 174 extend from one end of the trunk 172 and respectively contact the bulb envelope 110. The branches 174 may be deployed after passing through the opening 112 of the bulb envelope 110 and may lean against the inner surface of the bulb envelope 110. In the present embodiment, the trunk 172 may be constituted by a portion of the conductors 130, and the branches 174 are resilient and may be in contact with the intersection B between the sidewall 114 and the bottom wall 116 of the bulb envelope 110. In another embodiment, if the bulb envelope 110 does not have any sidewall 114 nor any bottom wall 116, e.g., if the top (or bottom) of the bulb envelope is a curved-surface structure, the supporting bracket 170 may also fix the position of the LED light emitting module 140 through at least three branches 174 leaning against the curved surface inside the bulb envelope.

In the present embodiment, if the bulb envelope 110 is a wine bottle or a similar elongated bottle, the bulb envelope 110 appears in bottle shape and extends along a central axis A, and a projection length of the LED light emitting module 140 on the central axis A may be greater than 40% of the projection length of the bulb envelope 110 on the central axis A. As such, the light from the LED light emitting module 140 may be evenly emitted from the entire light bulb 100. If the projection length of the LED light emitting module 140 on the central axis A is less than 40% of the projection length of the bulb envelope 110 on the central axis A, the top or bottom of the light bulb may be partially bright and partially dark, which may disfigure the look of light patterns and reduce the light emitting efficacy. Besides, if the length of the LED light emitting module 140 is overly short, that causes the lengths of the trunk 172 and the branches 174 of the supporting bracket 170 become overly long, which influences the appearance and the support stability of the support. After several trials and tests, the inventor found that the light emitting efficacy, the look of light patterns, the stability of the light emitting module, and the appearance of the entire lamp may all be taken care of if the projection length of the LED light emitting module 140 on the central axis A is greater than 40% of the projection length of the bulb envelope 110 on the central axis A.

Figure 3:
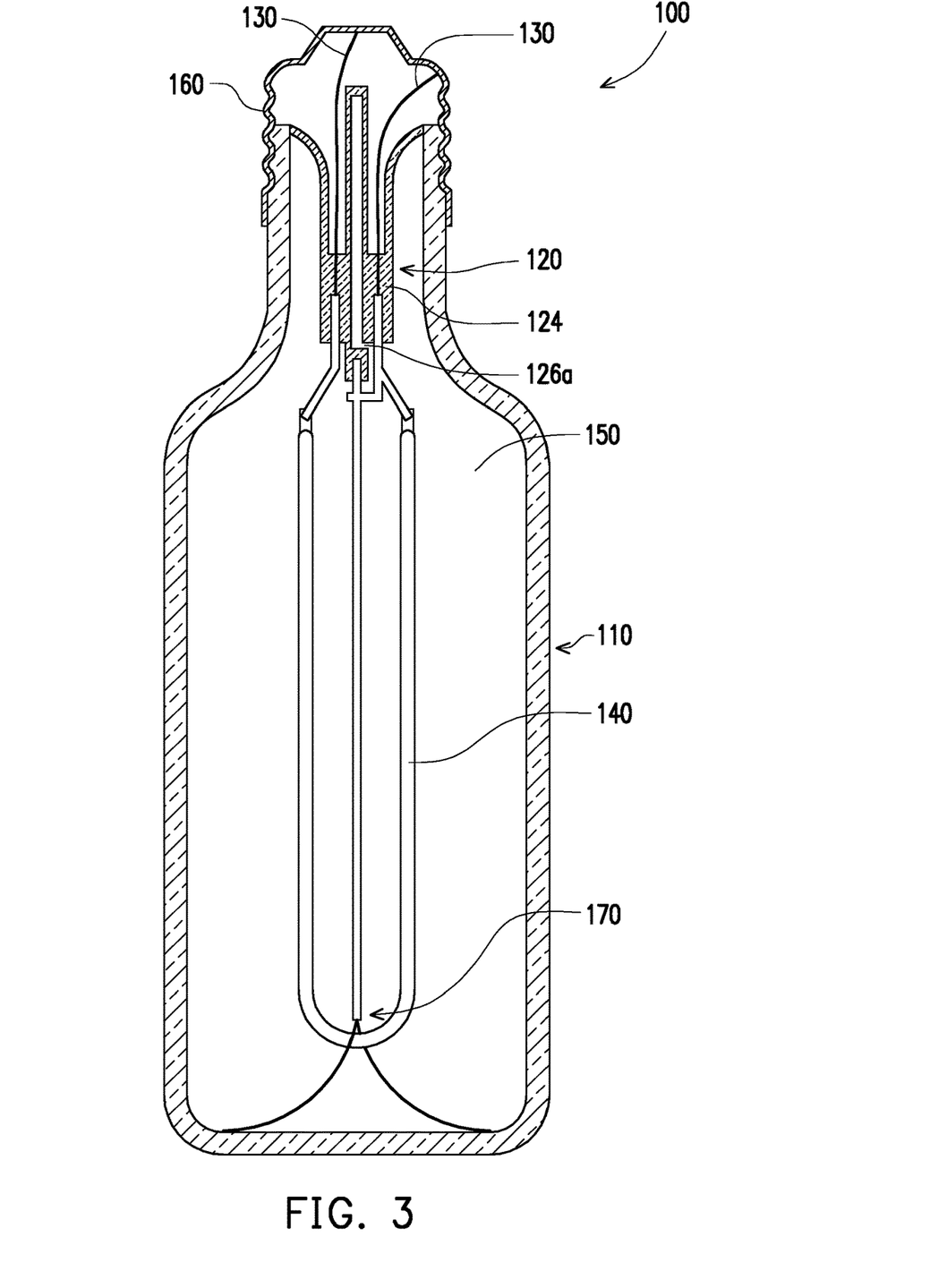
FIG. 3 is a cross-sectional view illustrating an LED light bulb according to another embodiment of the disclosure.
Figure 4:
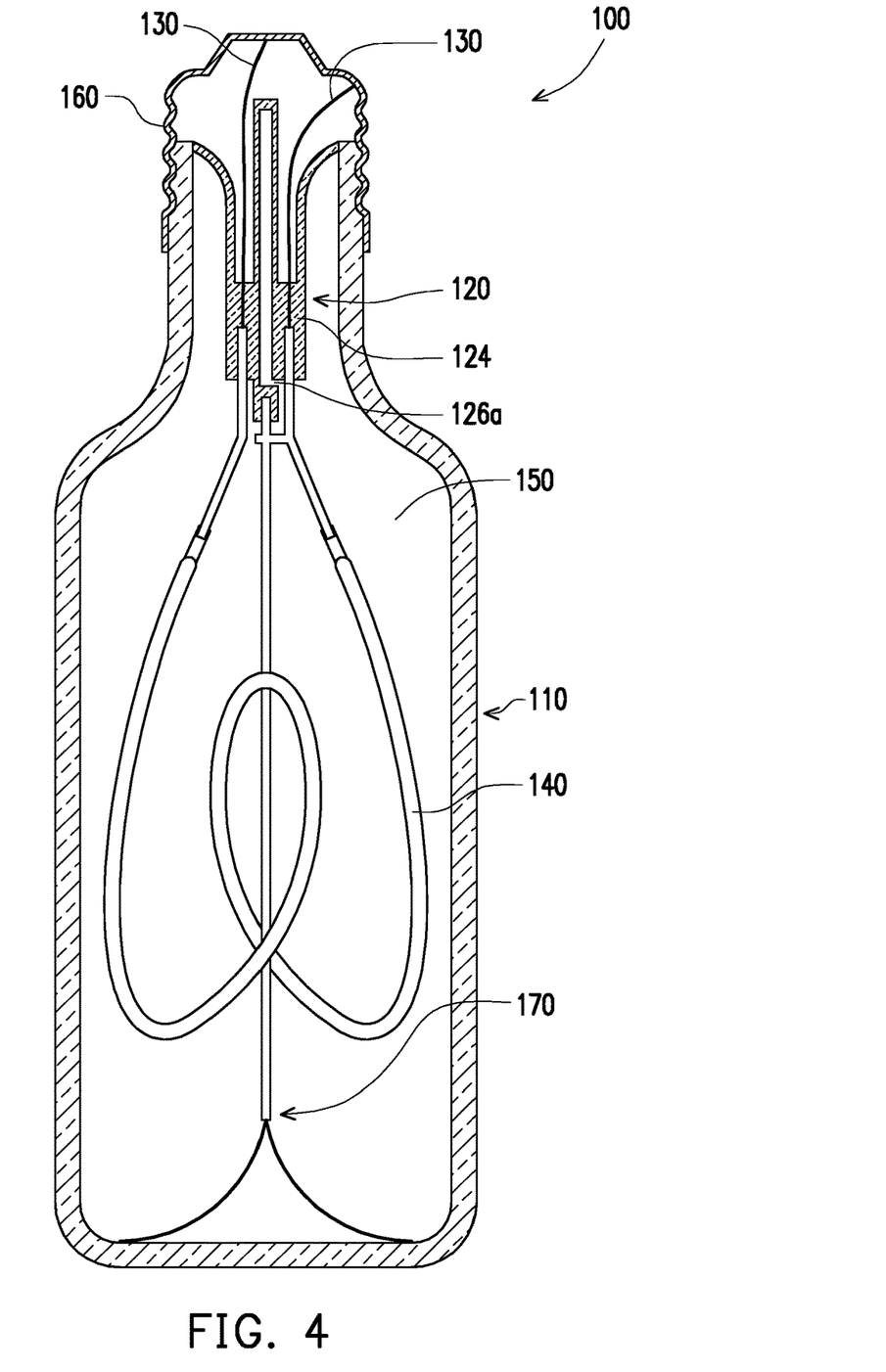
FIG. 4 is a cross-sectional view of an LED light bulb according to another embodiment of the disclosure.

In the present embodiment, the LED light emitting module 140 may be a flexible LED light emitting module and therefore may be bent in different shapes (e.g., a spiral shape), such as the spiral shape shown in FIG. 1 or a U-shape and a heart shape shown in FIG. 3 and FIG. 4, so as to present the visual effects of filament shape. Besides, the flexibility of the flexible LED light emitting module 140 allows the LED light emitting module 140 to be compressed and deformed when it passes through the neck portion 110a, and the LED light emitting module 140 may then expand in the bulb envelope 110 after passing through the neck portion 110a. In other words, the maximum width of the LED light emitting module 140 may be greater than the inner diameter of the neck portion 110a.

Figure 5:
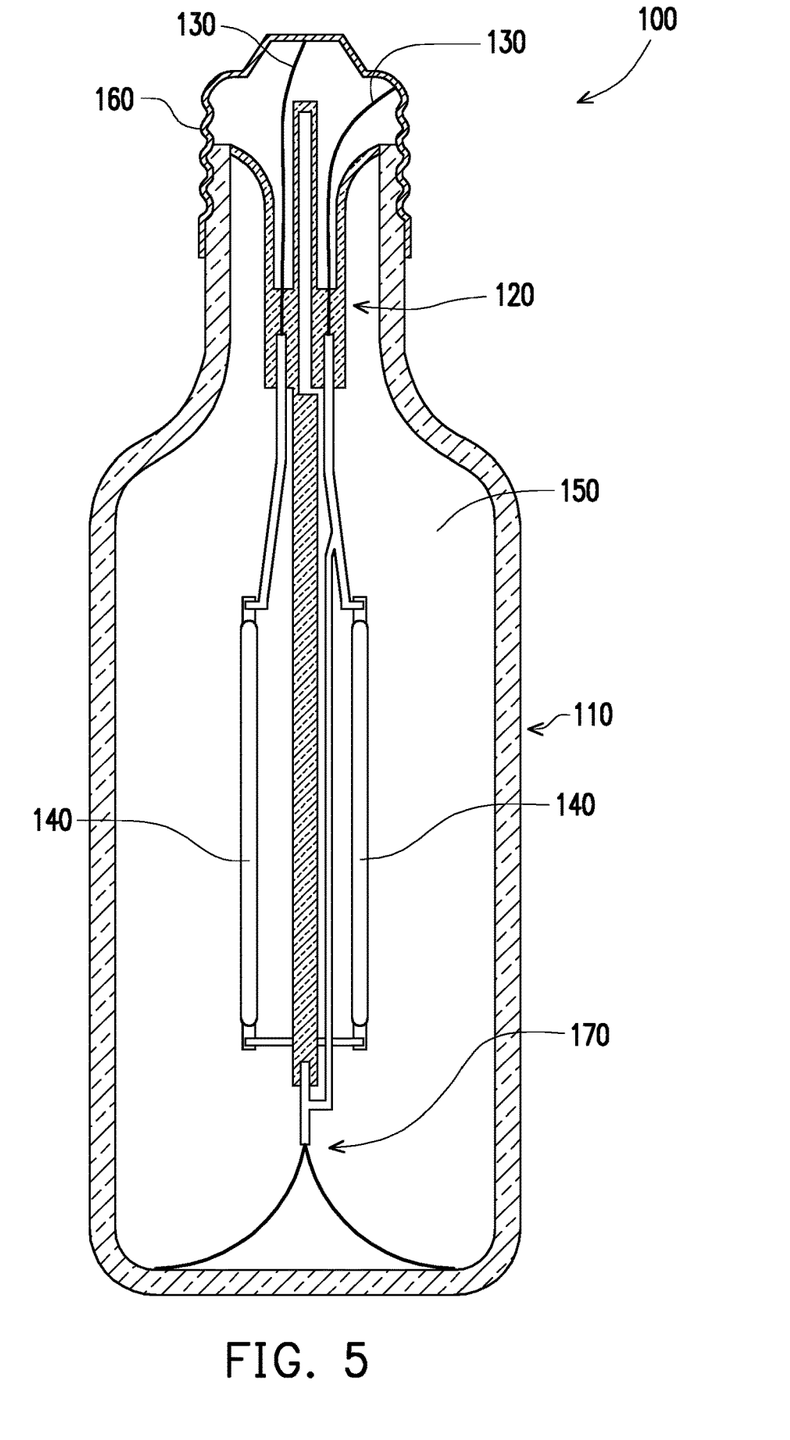
FIG. 5 is a cross-sectional view of an LED light bulb according to another embodiment of the disclosure.

In another embodiment, as shown in FIG. 5, the LED light bulb 100 may include a plurality of LED light emitting modules 140 that may be rigid LED light emitting modules. The LED light emitting modules 140 may be connected in series. In other embodiments not shown in the drawings, the LED light emitting modules 140 may also be connected in parallel.

Figure 6:
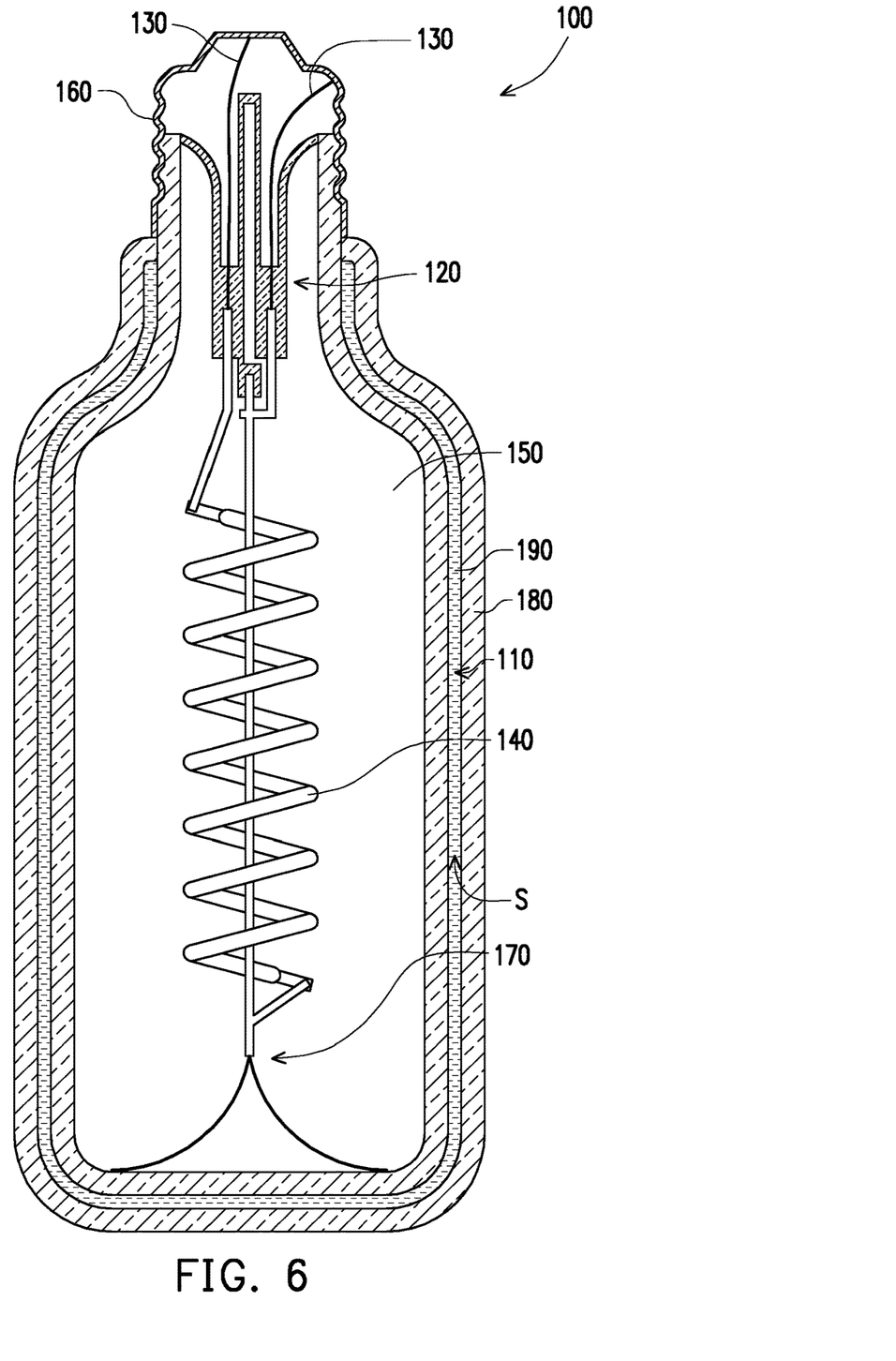
FIG. 6 is a cross-sectional view of an LED light bulb according to another embodiment of the disclosure.

In still another embodiment, compared to the embodiment depicted in FIG. 1, the embodiment shown in FIG. 6 provides the LED light bulb 100 that may further include an outer bulb casing 180 and liquid 190. The outer bulb casing 180 surrounds the bulb envelope 110 so that the outer bulb casing 180 and the bulb envelope 110 together form a layered space S surrounding the bulb envelope 110. The liquid 190 is located in the layered space S. Such settings may produce different visual effects under the refraction and reflection of light.

Having described various embodiments relating to the LED light bulb, for instance, a manufacturing method of an LED light bulb is further described below in an embodiment of the disclosure.

With reference to FIG. 1, the manufacturing method of the LED light bulb 100 in the present embodiment includes following steps.

Firstly, a stem 120 and an LED light emitting module 140 of a supporting portion 124 assembled to the stem 120 are positioned in a bulb envelope 110 through the opening 112 of the bulb envelope 110, wherein the LED light emitting module 140 is coupled to and located through at least two conductors 130 of the stem 120.

Then, the opening 112 of the bulb envelope 110 and a portion of a neck portion 110*a* adjacent to the opening 112 are pre-heated for a pre-heating time period, so that a temperature at which the opening 112 and the neck portion 110*a* are heated is a pre-heating temperature. In the present embodiment, a length of the portion of the neck portion 110*a* adjacent to the opening 112 is greater than half a maximum inner diameter of the opening 112.

After the pre-heating step, the opening 112 of the bulb envelope 110 and the portion of the neck portion 110*a* adjacent to the opening 112 are main-heated, so that the temperature at which the opening 112 and the neck portion 110*a* are heated is a main-heating temperature, and a side skirt 122 of the stem 120 is simultaneously sintered to the bulb envelope 110 to seal the opening 112 of the bulb envelope 110. In the present embodiment, the main-heating temperature (e.g., 500° C.-600° C.) is higher than the pre-heating temperature (e.g., 300° C.-400° C.). The soda-lime glass is characterized by its large coefficient of expansion, and therefore partial heating may easily cause glass cracks and cannot serve as a means of sealing. However, by using the method of the present embodiment, the temperature distribution in the soda-lime glass is even while the soda-lime glass is heated and sintered under the above conditions, which significantly reduces the cracks caused by uneven heating.

After the main-heating step, residual air is pumped from the bulb envelope 110 through a pipe 126 of the stem 120.

After the air-pumping step, fluid 150 is introduced into the bulb envelope 110 through the pipe 126 of the stem 120.

After gas-introducing, the pipe 126 is sealed, so that the bulb envelope 110 is in an airtight state.

In an embodiment, it may further include that, after the side skirt 122 of the stem 120 is sintered to the bulb envelope 110, the opening 112 and the neck portion 110*a* is post-heated for a post-heating time period so that the temperature at which the opening 112 and the neck portion 110*a* are heated is a post-heating temperature. In an embodiment, the post-heating temperature may be lower than or equal to the pre-heating temperature.

In the present embodiment, the manufacturing method of the LED light bulb may further include a step of assembling a bulb head 160 to the bulb envelope 110, and the bulb head 160 is coupled to the conductors 130.

To sum up, in the disclosure, the bulb envelope made of soda-lime glass enhances visual effects produced by the shape, color and light reflection of the LED light bulb. Besides, the arrangement of the supporting bracket (especially the supporting bracket may be deployed after passing through the opening of the bulb envelope and may lean against an inner surface of the bulb envelope) allows the LED light emitting module to be stably positioned in the bulb envelope. Besides, when the bulb envelope is shaped as a bottle or has an elongated shape similar to the bottle shape, the length of the LED light emitting module may be greater than 40% of the length of the bulb envelope, so as to enhance the visual effects produced by the LED light bulb.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:

1. An LED light bulb comprising:
    a bottle shape envelope having,
        a neck portion having an opening, wherein a length of a portion of the neck portion adjacent to the opening is greater than half a maximum inner diameter of the opening;
        a body portion connecting to the neck portion, wherein the body portion has a constant diameter along a central axis of the bottle shape envelop; and
        a standing portion connecting to the body portion and being away from the neck portion;
    a stem having a side skirt connected to the bottle shape envelope and sealing the opening, the stem having a supporting portion located in the bottle shape envelope, wherein the stem is located in the neck portion;
    at least two conductors located through the stem; and
    at least one LED light emitting module assembled to the supporting portion and coupled to the at least two conductors.

2. The LED light bulb of claim 1, further comprising:
    a supporting bracket assembled to the supporting portion and leaning against the bottle shape envelope, the supporting bracket having a trunk and a plurality of branches, the trunk extending from the supporting portion, the LED light emitting module being assembled to the trunk, each of the plurality of branches has two ends, one end being connected to the trunk and the other end contacting the bottle shape envelope at a contact point;
    wherein the number of the contact points between the other ends of the plurality of branches and the bottle shape envelope is equal to or greater than 2, at least one of the contact points is located at the standing portion, and a maximum linear distance among the contact points is greater than the maximum inner diameter of the opening.

3. The LED light bulb of claim 1, wherein a material of the bottle shape envelope comprises soda-lime glass.

4. The LED light bulb of claim 1, wherein the stem has a pipe, and the pipe has an open end in the bottle shape envelope and a sealed end facing an outside of the bottle shape envelope.

5. The LED light bulb of claim 1, further comprising:
    fluid filling the bottle shape envelope.

6. The LED light bulb of claim 5, wherein the fluid is non-conductive fluid.

7. The LED light bulb of claim 5, wherein the fluid is helium gas.

8. The LED light bulb of claim 1, wherein the bottle shape envelope has a flat bottom and extends along the central axis, and a projection length of the LED light emitting module on the central axis is greater than 40% of a projection length of the bottle shape envelope on the central axis.

9. The LED light bulb of claim 2, wherein the bottle shape envelope has a sidewall and a bottom wall connected to the sidewall at an intersection, and at least one of the contact points is located at the intersection.

10. The LED light bulb of claim 9, wherein any side of the sidewall appears to be a curved line extending upward from the intersection.

11. The LED light bulb of claim 1, wherein the LED light emitting module is a rigid LED light emitting module or a flexible LED light emitting module.

12. The LED light bulb of claim 1, further comprising:
a bulb head assembled to the bottle shape envelope and coupled to the at least two conductors.

13. The LED light bulb of claim 1, wherein the number of the LED light emitting module is equal to or greater than 2, and the LED light emitting modules are connected in series or in parallel.

14. The LED light bulb of claim 1, further comprising:
an outer bulb casing surrounding the bottle shape envelope, so that the outer bulb casing and the bottle shape envelope together form a layered space surrounding the bottle shape envelope; and
liquid located in the layered space.

\* \* \* \* \*